3,591,567
METHOD FOR PRODUCING INTERNALLY PLASTICIZED COPOLYMER OF VINYL CHLORIDE AND A HIGHER ALKYL ESTER OF CROTONIC ACID

Yuzo Chihara, deceased, late of Yokohama, Japan, by Waka Chihara, legal representative, 21, 11 Matsukagecho, Hakodate-shi, Hokkaido, Japan, and Ryoji Takahashi, 21 Otsutomacho, Yokohama, Japan
No Drawing. Continuation-in-part of application Ser. No. 561,722, June 30, 1966. This application Sept. 5, 1969, Ser. No. 870,591
Claims priority, application Japan, July 10, 1965, 40/41,357
Int. Cl. C08f 15/26
U.S. Cl. 260—86.3                    10 Claims

ABSTRACT OF THE DISCLOSURE

This invention relates to a method for producing an internally plasticized vinyl chloride copolymer having excellent transparency in films, processability, and heat stability, which comprises copolymerizing 100 parts by weight of vinyl chloride and between about 1 to 40 parts by weight of a higher alkyl ester of crotonic acid having 12 to 20 carbon atoms in the alkyl group.

RELATED APPLICATION

This application is a continuation-in-part of our prior application Ser. No. 561,722, filed June 30, 1966, and now abandoned.

BACKGROUND

Recent development of vinyl chloride resins for various fields of application has been quite amazing. Various kinds of copolymers of vinyl chloride as well as the homopolymer have been studied and put into production in a great variety of rigid and soft shaped articles.

When soft articles are to be made it is common procedure to incorporate a plasticizer such as dioctyl phthalate, dioctyl adipate, dibutyl phthalate, or the like, in polyvinyl chloride to reduce its softening point below its decomposition temperature and thereby increasing its softness and procesability for the production of various articles.

However, such articles have a drawback in that (a) the plasticizer tends to erude out of the surface and move to other articles with which it is in contact (b) it is easily extracted by a solvent such as oils or the like (c) in the heated state the articles produced tend to stick to each other by simple contact, which makes them unsuitable for food packaging.

Accordingly, the advent of a polyvinyl chloride containing only the slightest amount of or no plasticizer, but which still possesses the above-mentioned desired properties gained by a plasticizer, has been desired and searched for.

Since the so-called internally plasticized products obtained by the copolymerization of vinyl chloride with a higher alkyl vinyl ether exhibit better properties, they are now being extensively used and their development seems to be remarkable.

Beside copolymers with higher alkyl vinyl ethers, those copolymers with vinyl esters of higher fatty acid, higher alkyl esters of acrylic, methacrylic, maleic, fumaric, itaconic acid or the like, have been also studied as internally plasticized products and some of them seem to have been used for practical purposes. It is known that copolymers with higher vinyl ethers, e.g. lauryl vinyl ether, cetyl, vinyl ether, and stearyl vinyl ether possess good processability and heat stability that is superior to copolymers with other vinyl compounds.

However, even the copolymers with such vinyl ethers have several defects. For instance, although their processability and heat stability are superior to other kinds of copolymers, their clarity is considerably inferior to the homopolymer of vinyl chloride or the copolymer of vinyl chloride and vinyl acetate. When the thickness of molded articles is large, white turbidity become so conspicious that they look translucent. Clarity may be improved to some extent by using a higher processing temperature, but such elevated processing temperatures are usually over the heat stability limit and coloring of the resin often results.

When the amount of higher vinyl ether is increased in order to lower the softening point and to increase the processability of the resin, the relative amount of vinyl ether in the monomers becomes greater with the progress of polymerization because of its exceedingly small reactivity compared with vinyl chloride in the copolymerization. This not only reduces the polymerization rate but also increases the amount of unreacted vinyl ether in the resultant resin, whereby strength and other desirable properties, as well as clarity, are greatly reduced. Hence, the copolymers of higher vinyl ether content possessing good properties cannot be produced unless a troublesome aftertreatment, such as extraction, is resorted to.

On the other hand, the copolymers with esters of acrylic, methacrylic, maleic, fumaric, itaconic acid or with vinyl esters of higher fatty acid avoids the above-mentioned defects, but the heat stability is not sufficient. Some of them often show coloring even while being prepared.

THE PRESENT INVENTION

Accordingly, it is an object of the present invention to provide an internally plasticized copolymer of vinyl chloride in which the above-mentioned drawbacks are overcome. In other words, the present invention results in a copolymer possessing good heat stability, softness, clarity, processability, and solubility in various solvents. It is another object of the present invention to provide a method for producing such a copolymer. These and other objects and advantages can be attained by carrying out the teachings of the present invention.

According to the present invention, vinyl chloride and a higher alkyl ester of crotonic acid are copolymerized to produce a copolymer possessing excellent properties. In other words, our resin is obtained by copolymerizing vinyl chloride with a higher alkyl ester of crotonic acid particularly with that possessing 12 to 20 carbon atoms in its alkyl radical and shows excellent transparency, good processability, suitable softness, as well as mechanical properties and heat stability acceptable at common processing temperatures. Further, it is possible to improve the softness, transparency, processability, and low-temperature brittleness of a polyvinyl chloride resin by increasing the ratio of the co-monomer.

In the past the copolymerization of vinyl chloride with crotonic acid or lower alkyl ester thereof (e.g. methylester, ethylester, allylester or the like) has been investigated and disclosed in B.P. 471,670, B.P. 600,905, Japanese patent application 10,537/1964, and "High Molecular Chemistry," vol. 16, p. 308 (1959). However, we were the first to discover that the copolymerization of vinyl chloride with a higher alkylester of crotonic acid results in resins which are superior to conventional resins in heat stability, transparency, softness, processability, and mechanical properties.

A general procedure for carrying out the method of the present invention will now be set forth.

One to 40 parts by weight of a higher alkylester of crotonic acid having 12 to 20 carbon atoms in its alkyl radical (normal, iso, primary, secondary, or tertiary) is added to 100 parts by weight of vinyl chloride and subjected to suspension polymerization in a pressure-resistant polymerization vessel equipped with a stirrer. Alternatively, emulsion polymerization can also be used. As a catalyst, a radical polymerization initiator is used, namely an organic peroxide such as lauryl peroxide, benzoyl peroxide, or an oil soluble initiator such as azobis-isobutyronitrile or azobis-valeronitrile in an amount preferably from 0.01 to 1.0 percent by weight.

As a suspension stabilizer, a synthetic high molecular weight substance such as polyvinyl alcohol, hydrolysate of vinyl acetate-crotonate-copolymer, partial hydrolysate of polyvinyl acetate, a semi-synthetic high molecular substance such as methyl cellulose, carboxymethyl cellulose, or a natural water-soluble high molecular substance such as starch, gelatine, is used alone or in a combination thereof, commonly in an amount between about 0.01 to 2.0 percent by weight.

The polymerization temperature used is generally in the range of about 40° to 80° C.

The results of comparing the physical properties of our copolymer with those of other kinds of copolymers are as follows:

tensile strength and impact resistance of the final article—as well as much superior in its clarity and degree of coloration owing to the initial heat stability.

As the amount of the higher ester of crotonic acid in the copolymer is increased, the softening point of the copolymer is lowered and its processing feasibility is improved. When used in an amount of 10 weight percent or more, the above-mentioned copolymer becomes soluble in such solvents as methylethyl ketone, methylisobutyl ketone, cyclohexanone, a mixture of acetone and ethyl acetate, and butyl acetate, although this depends to some extent on the kind and size of the alkyl group, so that it can be used as a resin for painting.

If more than 10% of the higher ester of crotonic acid is used in the copolymer, some of it remains unreacted in the resultant copolymer, and should be removed using a solvent for further processing, but when some plasticizer is incorporated into the resin, the unreacted ester need not be removed.

The effect of the present invention with regard to the copolymers of vinyl chloride and higher alkyl esters of crotonic acid of the example to be stated later can be demonstrated in comparison with other copolymers, as follows:

| Components of copolymerization (ratio percent) | Mean polymerization, degree | K flow (cc./sec.) | S.T.[1] (° C.) | Thermal deformation temperature (° C., 60 mil) | Tensile strength (kg./mm.[2]) |
|---|---|---|---|---|---|
| HC-825L [2] | 700 | 12.7×10−3 | 60.4 | 68.3 | 6.1 |
| NHS-LT [3] | 650 | 16.4×10−3 | 50.9 | 66.3 | 6.1 |
| Stearyl crotonate (2.5) | 660 | 17.2×10−3 | 59.2 | 66.2 | 6.2 |
| Stearyl crotonate (5.0) | 620 | 7.9×10−3 | 40.5 | | 5.5 |

[1] Softening temperature (Tf), or the temperature at which rigidity reaches $3.17 \times 10^9$ dyne/cm.$^2$ in ASTM D1043-61T.
[2] The alkyl vinyl ether copolymer of Kureha Chemical Company.
[3] The alkyl vinyl ether copolymer of Chisso Corporation.

For example, 100 parts by weight of vinyl chloride monomer and 10 parts each by weight of stearyl crotonate, cetyl vinyl ether, cetyl acrylate, cetyl methacrylate, dioctyl maleate vinyl stearate were copolymerized under the same conditions or conditions of copolymerization. Test specimens of sheet were prepared by dissolving the copolymers thus obtained in tetrahydrofuran and casting. By comparing the heat stability at the initial stage of each specimen by its degree of color on heating at 160° C., their heat stabilities were found to be in the order of stearyl crotonate copolymer≫cetyl vinyl ether copolymer>vinyl chloride homopolymer>vinyl stearate copolymer>dioctyl maleate copolymer≫cetyl acrylate copolymer≫cetyl methacrylate copolymer. In other words, the higher ester of crotonic acid was found to be equal or superior to higher vinyl ether in heat stability.

Further, as a result of incorporating an ordinary stabilizer, such as cadmium stearate (and others) in the above-mentioned copolymers, shaping the resultant mixtures into film or sheet and testing the heat stability and clarity of each specimen, copolymers of the higher ester of crotonic acid was found to be much superior to those of higher alkyl vinyl ethers in clarity. In this test the other copolymers were also found to be inferior to the former. Although the copolymers of higher esters of crotonic acid were found to vary more or less in heat stability, depending on the kind of the stabilizer incorporated therewith, they were found to excel the others in initial heat stability, and did not exhibit the amount of coloration that was observed to take place from the initial stage in the case of copolymers of esters of acrylic, methacrylic and maleic acid or vinyl ether.

Furthermore, it has been found as a result of shaping the above-mentioned copolymers (incorporated with stabilizers) into molded articles and sheets (using extruders, injection molding machines, and a T-die molding machine) that the higher ester of crotonic acid is superior to the others in processability, faster in the flow rate of molten resin (measured with a Koka type flowmeter), and equal or superior to the conventional copolymers in The higher esters of crotonic acid which are mentioned here mean the esters obtained by normal- or iso-primary, secondary, or tertiary alcohols, having 12 to 20 carbons, such as lauryl, isolauryl, tridecyl, cetyl and stearyl alcohols.

The greater the number of carbon atoms in such alcohol, the higher the amount of the ester in the resultant copolymer, the less is the reduction of the degree of polymerization and the better is the processability of the copolymer. In this regard, is it preferable to use a crotonate having 12 to 20 carbon atoms in the alkyl group.

The cotonates having more than 20 carbon atoms in the alkyl group are not preferred since it is difficult to obtain alcohols as raw materials for producing alkyl crotonates.

Representative examples of preparation of the above-mentioned copolymers are given below, but they should by no means be considered a limitation upon the method of producing internally plasticized vinyl chloride resin in accordance with the present invention. Parts and percent in the following examples are all by weight.

EXAMPLE 1

95 parts of vinyl chloride, 5 parts of stearyl crotonate, 0.4 part of polyvinyl alcohol, 0.1 part of polyethyleneglycol monoalkylether, 0.2 part of lauroyl peroxide and 200 parts of demineralized water were introduced into a 2 liter stainless steel polymerization vessel equipped with a jacket and a stirrer.

Polymerization was carried out at a temperature of 60–63° C. with stirring at 600 r.p.m. according to the procedure customarily used in the polymerization of vinyl chloride. The polymerization was stopped after 10 hours. After unreacted vinyl chloride was vented off, the polymerization product was discharged from the vessel, washed with warm water and dried. 89 parts of white fine particles were obtained. Polymerization yield: 89%.

The resin thus obtained had a polymerization degree of 700 to 710, a chlorine content of 52.96% and a content of the unit derived from stearyl crotonate of 6.0%.

The copolymerized resin was dissolved in tetrahydrofuran, poured into a mould, followed by vaporization of the solvent and drying of the resin for two days in vacuo. Then a sheet of 0.5 mm. in thickness was prepared.

Several other 0.5 mm. sheets were also prepared from the following copolymers by the same procedure as above-mentioned.

Vinyl chloride-cetyl vinylether copolymer, vinyl chloride-lauryl acrylate copolymer, vinyl chloride- lauryl methacrylate copolymer, vinyl chloride-dioctyl maleate copolymer and vinyl chloride- vinyl stearate copolymer. These sheets were placed in a Geer oven at a temperature of 160° C. and coloring velocities in the heat-treatments for 5, 10, 15, 20 minutes (and so on) were determined.

Further, each of the copolymers (into which about 3% of cadmium stearate was incorporated) were kneaded by rolls and pressed into a sheet, which was then examined for transparency.

The results are shown in Table 1.

TABLE I

| | Comonomer [1] | Coloring rate | | | | Transparency |
|---|---|---|---|---|---|---|
| | | 5 min. | 20 min. | 25 min. | 30 min. | |
| The present invention | Stearyl crotonate | 0 | 0 | 1 | 1 | A |
| Comparative examples | Cetyl vinylether | 1 | 1 | 1 | 2 | B |
| | Vinyl stearate | 1 | 1 | 2 | 3 | B |
| | Dioctyl maleate [2] | 1 | 1 | 2 | 3 | B |
| | Lauryl acrylate [2] | 2 | 3 | 4 | 5 | B |
| | Lauryl methacrylate [2] | 4 | 5 | 5 | 5 | D |
| | 2-ethylhexyl crotonate | 0 | 1 | 2 | 2 | B |

[1] The introduced amount: 5 parts.
[2] The resin had a pale color from the beginning.

The evaluation of coloring was made by the following standards:

0: colorless; 1: slightly pale yellow; 2: pale yellow; 3: yellow; 4: pale brown; 5: brown or black brown.

Further, the transparency was evaluated by the following standards:

A: fair; B: permissible; C: poor; D: not permissible or bad.

As apparent from Table 1, the copolymers of the present invention were superior both in initial stability and in transparency. The 2-ethylhexyl crotonate (having 8 carbon atoms in the alkyl group) was insufficient because of its coloring and transparency compared with stearyl crotonate.

EXAMPLE 2

The following ingredients were introduced into a polymerization vessel similar to that of Example 1 and polymerization was carried out at 58–60° C. for 30 hours.

| | Parts |
|---|---|
| Vinyl chloride | 90 |
| Cetyl crotonate | 10 |
| Polyvinyl alcohol | 0.4 |
| Polyethyleneglycol monoalkylether | 0.1 |
| Lauroyl peroxide | 0.2 |
| Demineralized water | 200 |

A vinyl chloride-cetyl crotonate copolymer of a white powder was obtained. Yield: 86%. The polymer had a chlorine content of 49.9%, a content of the cetyl crotonate unit of 11.6% and a polymerization degree of 670.

By the use of the resultant copolymer, the preparation of film, the evaluation of coloring rate, the preparation of sheet, and the evaluation of transparency were carried out similarly to Example 1, except that 2% of cadmium stearate was incorporated in the preparation of sheets.

The results are shown in Table 2 together with comparative examples.

TABLE 2

| | Comonomer [1] | Coloring rate | | | | Transparency |
|---|---|---|---|---|---|---|
| | | 5 min. | 10 min. | 15 min. | 20 min. | |
| The present invention | Cetyl crotonate | 0 | 0 | 1 | 2 | A |
| Comparative examples | Cetyl vinylether | 1 | 1 | 2 | 2 | B |
| | Vinyl stearate | 1 | 2 | 3 | 4 | C |
| | Dioctyl maleate | 1 | 2 | 3 | 4 | B |
| | Lauryl acrylate | 4 | 5 | 5 | 5 | D |
| | Lauryl methacrylate | 5 | 5 | 5 | 5 | D |
| | 2-ethylhexyl crotonate | 0 | 1 | 2 | 3 | B |

[1] The introduced amount: 10 parts.

EXAMPLE 3

The following ingredients were introduced into a polymerization vessel similar to that of Example 1 and polymerization was carried out at 62–65° C. for 20 hours.

| | Parts |
|---|---|
| Vinyl chloride | 90 |
| Lauryl crotonate | 10 |
| Polyvinyl alcohol | 0.4 |
| Polyethyleneglycol monoalkylether | 0.1 |
| Lauroyl peroxide | 0.2 |
| Demineralized water | 200 |

A vinyl chloride-lauryl crotonate copolymer was thus obtained. Yield: 87.6%. The polymer had a chlorine content of 49.4% and a polymerization degree of 610. The polymer was dissolved in tetrahydrofuran and made into a sheet.

The coloring rate was examined at 160° C. similarly to Example 1. The results were as follows:

5 min.: 0; 10 min.: 0, 15 min.: 1; and 20 min.: 2.

Further, 100 parts of the copolymer, one part of cadmium stearate and one part of diglycidyl ether of dimer of 2,2-bis(p-hydroxy-phenyl) propane were blended and kneaded at 150° C., for 10 minutes, and then pressed at 150° C., for 5 minues into a sheet, which was similarly examined for coloring rate and transparency. The results are shown in Table 3.

TABLE 3

| | Comonomer [1] | Coloring rate | | | | | Transparency |
|---|---|---|---|---|---|---|---|
| | | 5 min. | 10 min. | 15 min. | 30 min. | 60 min. | |
| The present invention | Lauryl crotonate | 0 | 0 | 0 | 0 | 3 | A |
| Comparative examples | Cetyl vinylether | 1 | 1 | 1 | 2 | 3 | B |
| | Vinyl stearate | 1 | 2 | 2 | 3 | 5 | C |
| | Dioctyl maleate | 1 | 2 | 2 | 3 | 5 | B |
| | Cetyl acrylate | 4 | 4 | 5 | 5 | 5 | D |
| | Cttyl methacrylate | 4 | 5 | 5 | 5 | 5 | D |
| | 2-ethylhexyl crotonate | 0 | 0 | 1 | 2 | 4 | B |

[1] The introduced amount: 10 parts.

EXAMPLE 4

The following ingredients were introduced into a polymerization vessel similar to Example I and polymerization was carried out at 60–63° C. for 14 hours.

| | Parts |
|---|---|
| Vinyl chloride | 80 |
| Stearyl crotonate | 20 |
| Polyvinyl alcohol | 0.4 |
| Polyethyleneglycol monoalkylether | 0.1 |
| Lauroyl peroxide | 0.2 |
| Demineralized water | 200 |

The vinyl chloride-stearyl crotonate copolymer obtained had a chlorine content of 45.16% and a polymerization degree of 370. Yield: 77.7%.

The polymer was dissolved in tetrahydrofuran and made into a sheet. The resultant sheet and a sheet prepared by incorporating the stabilizer in the same polymer, followed by kneading, and pressing as in Example 3, were subjected to a heat-stability test at 160° C. It was observed that the former sheet had the same grade of superior heat-stability as that of Example 1 and the latter sheet the same grade of heat stability as that of Example 3.

EXAMPLE 5

The following ingredients were introduced into a polymerization vessel similar to Example 1 and polymerization was carried out at 60–63° C. for 10 hours.

| | Parts |
|---|---|
| Vinyl chloride | 27.5 |
| Stearyl crotonate | 2.5 |
| Polyvinyl alcohol | 0.4 |
| Acetylenediol | 0.1 |
| Lauroyl peroxide | 0.2 |
| Demineralized water | 200 |

The vinyl chloride-stearyl crotonate copolymer thus obtained had a chlorine content of 54.5% and a polymerization degree of 640. Yield: 93.0%.

The copolymer was dissolved in tetrahydrofuran and made into a sheet. The sheet obtained and a sheet prepared by incorporating the stabilizer in the polymer as in Example 3, were subjected to a heat-stability test at 160° C., whereby superior results similar to the same example were also obtained.

EXAMPLE 6

The following ingredients were introduced into a polymerization vessel similar to Example 1 and polymerization was carried out at 60–62° C. for 20 hours.

| | Parts |
|---|---|
| Vinyl chloride | 90 |
| Isolauryl crotonate | 10 |
| Polyvinyl alcohol | 0.4 |
| Polyethyleneglycol monoalkylether | 0.1 |
| Lauroyl peroxide | 0.2 |
| Demineralized water | 200 |

The vinyl chloride-isolauryl crotonate copolymer obtained had a chlorine content of 49.6% and a polymerization degree of 590. Yield: 85.3%

Heat-stability and transparency tests showed superior results, as in the foregoing examples, and the mechanical strength was also excellent.

What is claimed is:

1. An internally plasticized copolymer consisting essentially of 100 parts by weight of vinyl chloride and from about 1 to 40 parts by weight of higher alkyl ester of crotonic acid having 12 to 20 carbon atoms in the alkyl group.

2. The copolymer according to claim 1 wherein said higher alkyl ester of crotonic acid is stearyl crotonate.

3. The copolymer according to claim 1 wherein said higher alkyl ester of crotonic acid is cetyl crotonate.

4. The copolymer according to claim 1 wherein said higher alkyl ester of crotonic acid is lauryl crotonate.

5. The copolymer according to claim 1 wherein said higher alkyl ester of crotonic acid is isolauryl crotonate.

6. A method for producing an internally plasticized vinyl chloride copolymer which comprises copolymerizing 100 parts of vinyl chloride with from about one to 40 parts of a higher alkyl ester of crotonic acid, having 12 to 20 carbon atoms in the alkyl group, polymerization being carried out at 40°–80° C. in the presence of a polymerization catalyst and a suspension stabilizer.

7. A method according to claim 6 wherein said higher alkyl ester of crotonic acid is stearyl crotonate.

8. A method according to claim 6 wherein said higher alkyl ester of crotonic acid is cetyl crotonate.

9. A method according to claim 6 wherein said higher alkyl ester of crotonic acid is lauryl crotonate.

10. A method according to claim 6 wherein said higher alkyl ester of crotonic acid is isolauryl crotonate.

References Cited

UNITED STATES PATENTS

| 2,470,911 | 5/1949 | Baer | 260—86.3 |
|---|---|---|---|
| 2,624,724 | 1/1953 | Park | 260—86.3 |
| 3,049,521 | 8/1962 | Burkholder | 260—86.3 |
| 3,074,905 | 1/1963 | Douglas | 260—86.3 |
| 3,244,677 | 4/1966 | Glazer | 260—86.3 |

FOREIGN PATENTS

| 1,486,251 | 6/1967 | France |
|---|---|---|

HARRY WONG, Jr., Primary Examiner

U.S. Cl. X.R.

260—30.4, 31.2, 31.8, 32.8, 78.5, 80.81, 86.1, 87.1, 87.5, 92.8